United States Patent Office 2,904,608
Patented Sept. 15, 1959

2,904,608

NICKEL OXIDE CATALYSTS AND THEIR USE IN POLYMERIZING OLEFINS

Vernon C. F. Holm, Grant C. Bailey, and Alfred Clark, Bartlesville, Okla., assignors to Phillips Petroleum Company, a corporation of Delaware No Drawing. Application April 26, 1956
Serial No. 580,705

13 Claims. (Cl. 260—683.15)

This invention relates to an improved method or process for preparing supported nickel oxide catalyst for the polymerization of olefins, to the resulting novel catalysts, and to the polymerization of olefins in contact with said catalysts.

The polymerization of olefins with nickel oxide supported on silica-alumina and other porous supports is disclosed in patents to G. C. Bailey and J. A. Reid, 2,381,198 and 2,581,228. The process disclosed is particularly useful in view of the fact that it is effective in polymerizing ethylene as well as higher olefins. The polymerization of ethylene to liquid polymers is particularly difficult and can be effected by very few known catalysts.

In any catalytic conversion process the activity of the catalyst as measured by the yield of desirable product is significant to the commercial success of the process. It is, of course, desirable to utilize as effective a catalyst as possible; and any appreciable increase in yield produced by an improved catalyst represents a distinct advance in the process or art to which it is related.

Accordingly, it is an object of the invention to provide an improved process for making supported nickel oxide polymerization catalysts and resulting novel catalysts. Another object is to provide more active supported nickel oxide catalysts for olefin polymerization than have heretofore been known. A further object is to provide a more efficient and effective process for polymerizing olefins to liquid polymers. Other objects of the invention will become apparent from a consideration of the accompanying disclosure.

Supported nickel oxide catalysts are ordinarily prepared by impregnation of a selected support, such as silica-alumina, with a nickel salt which is convertible to the oxide by heating, subsequently drying the impregnated support, and then heating the same to a temperature in the range of about 300 to 700° C. to convert the nickel salt to the oxide. The heating is usually effected in an oxygen-containing ambient such as air or, at least, in a non-reducing ambient. The catalyst ordinarily contains from about 0.1 to 10 weight percent nickel, although higher amounts may be used. Optimum activity ordinarily is associated with the amount of nickel in this range however, and, hence little is to be gained by using larger amounts. The concentration of nickel salt in the impregnating solution varies with the desired ultimate concentration of nickel on the final catalyst. Obviously, more concentrated solutions of nickel salt are used to produce greater concentrations of nickel in the final catalyst. The broadest aspect of the invention comprises impregnating a selected support, such as silica-almina, with an aqueous ammoniacal solution of a nickel salt convertible to the oxide upon heating, particularly in a free-oxygen-containing ambient and heating the resulting composite so as to convert the nickel compound to the oxide.

Another aspect of the invention comprises impregnating the selected support with an aqueous ammoniacal solution of a nickel salt convertible to the oxide upon heating, particularly in an oxygen-containing ambient and utilizing a plurality of impregnating steps with conversion of the nickel salt to the oxide between impregnation steps and after the last one. The conversion of the nickel salt to the oxide after each impregnation prevents loss of nickel compound from the support during a subsequent impregnation.

It has been found that impregnation of the porous support with an ammoniacal solution in accordance with the invention produces a more active catalyst for the polymerization of ethylene than impregnation with either a neutral or acid solution of nickel. It has been found, also, that multiple impregnation of the support with nickel oxide, via a suitable nickel salt, produces a more active catalyst than is prepared by a single impregnation step which deposits a corresponding amount of nickel oxide on the catalyst. Three or more impregnations are preferred, but only two impregnations with conversion to the oxide after each produces a catalyst of enhanced activity.

It has also been found that hot impregnation of the catalyst support effects a substantial improvement in the activity of the catalyst for olefin polymerization with single and with multiple impregnation. Hence, this aspect of the invention comprises impregnating a suitable carrier with a hot aqueous ammoniacal solution of nickel salt at a temperature of at least 70° C. and up to the boiling point of the solution and, preferably, maintaining the mixture of support and solution at a temperature in this range for a substantial period, such as at least 10 minutes and preferably 15 minutes or longer, to effect the desired and improved impregnation. It is desirable to maintain the impregnating solution under substantial superatmospheric pressure while hot and during the heating step to minimize loss of ammonia.

A further aspect of the invention comprises polymerizing polymerizable olefins under polymerizing conditions in contact with a catalyst made in accordance with the invention. The catalysts of the invention are particularly effective in polymerizing normally gaseous olefins, including ethylene.

Catalyst supports useful in the invention include silica-alumina, alumina, silica, kieselguhr, activated clay, charcoal, and the like. The most effective and the preferred support is silica-alumina and, particularly, silica-alumina in which the silica is in major proportion, preferably at least 75 weight percent of the support. Nickel compounds or salts which have been found to be effective in the impregnation process of the invention are nickel nitrate and the alkyl carboxylic acid and salts of nickel such as the formate and the acetate. In forming the impregnating solution, the nickel salt, preferably nickel nitrate is dissolved in water, and ammonium hydroxide is added there to in an amount at least sufficient to re-dissolve any nickel hydroxide that forms during the initial stages of the addition of ammonium hydroxide.

In order to illustrate the invention, the following specific example is presented but is not to be construed as unnecessarily limiting the invention.

EXAMPLE

Pellets of commercial silica-alumina cracking catalyst were broken and a 16–30 mesh fraction separated. About 50 ml. of the 16–30 mesh fraction was treated with about 75 ml. of an 0.8 molar nickel nitrate solution. After about 15 minutes, the support was drained and then dried in an evaporating dish on a hot plate with constant stirring. After further drying in an oven at 110° C., the catalyst was heated gradually to 500° C. in a stream of dried air and then held at this temperature for five hours to decompose the nickel nitrate to nickel oxide.

A catalyst was made by the method of the present invention using the above procedure except that the nickel ion of the nickel nitrate solution was converted to $Ni(NH_3)_4^{++}$ by addition of ammonium hydroxide.

For further comparison, a catalyst was made by the first procedure described with the exception that sufficient nitric acid was added to the nickel nitrate solution to double the concentration of the nitrate ion.

The ethylene polymerization tests were made with each catalyst using a glass reactor equipped with an axial thermocouple well that permitted temperature measurements on the catalyst bed which was supported on a perforated glass platform in the hot zone of the reactor. The reactor was mounted in a vertical tube furnace fitted with a heavy metal sleeve for temperature equalization. Dried ethylene was admitted at the top from a calibrated flowmeter and the reacted mixture was passed through a trap cooled by a Dry-Ice bath below the reactor. The unreacted ethylene from the trap was passed through a second calibrated flowmeter. Thus with a given flow rate of ethylene, readings of the second flowmeter made possible a satisfactory calculation of the instantaneous values for the conversion of ethylene to dimers, trimers, and higher polymers.

Prior to a run, the reactor was charged with 2 ml. of the catalyst and with a slow stream of dry nitrogen flowing, the furnace was heated to 400° C., held at this temperature for about an hour, and cooled to room temperature overnight. Then with the refrigerated receiver in place, the nitrogen was cut off and the flow of Phillips research grade ethylene started at a gaseous hourly flow rate of 2500. The furnace was turned on at a voltage to attain 300° C. in two hours. Flowmeter and temperature readings were made at five-minute intervals. Maximum conversion occurred at the maximum temperature, 300° C.

*Results of tests*

| Impregnating Method | Percent Nickel on Catalyst | Percent Ethylene Polymerized Max. Conversion |
|---|---|---|
| Neutral nickel solution | 3.4 | .54 |
| Acid nickel solution | 2.96 | .52 |
| Ammoniacal nickel solution | 4.26 | .58 |

Olefin polymerization conditions conventional in the art are applicable to the olefin polymerization process of the invention utilizing our improved more active catalyst. Preferred operating conditions are set forth in the above-identified Bailey et al. patents.

Certain modifications of the invention will become apparent to those skilled in the art and the illustrative details disclosed are not to be construed as imposing unnecessary limitations on the invention.

We claim:

1. A process for preparing a supported nickel oxide polymerization catalyst comprising impregnating a suitable porous support with an ammoniacal aqueous solution of a nickel salt convertible to the oxide upon heating in a free-oxygen-containing ambient; drying the impregnated support; and, as the final step in the process, heating the dried composite in a free-oxygen-containing ambient so as to convert the nickel salt to nickel oxide in the composite.

2. The process of claim 1 wherein the nickel salt is nickel nitrate.

3. The process of claim 2 wherein the support is silica-alumina.

4. The process of claim 1 including repeating the steps of impregnation, drying, and heating after conversion to the oxide so as to provide more effective distribution of nickel oxide on the support.

5. The process of claim 4 wherein the impregnation steps are effected at a temperature in the range of about 70° C. to the boiling point of the impregnating solution and the solution is maintained under substantial superatmospheric pressure during impregnation.

6. The process of claim 1 wherein the impregnation steps are effected at a temperature in the range of about 70° C. to the boiling point of the impregnating solution and the solution is maintained under substantial superatmospheric pressure during impregnation.

7. A process for preparing a supported nickel oxide polymerization catalyst comprising impregnating a porous silica-alumina support with an ammoniacal aqueous solution of nickel nitrate prepared by adding ammonium hydroxide to an aqueous solution of nickel nitrate in sufficient quantity to dissolve the nickel hydroxide precipitated on initial addition of the ammonium hydroxide; drying the impregnated support at an elevated temperature; and, as the final step in the process, heating the dried composite in a free-oxygen-containing ambient at a temperature in the range of 300 to 700° C. so as to convert the nickel salt prepared as aforesaid to nickel oxide in the support and activate the catalyst.

8. A process for polymerizing a polymerizable olefin which comprises contacting said olefin under polymerizing conditions with a supported nickel oxide catalyst made by the process of claim 1.

9. The process of claim 8 wherein the catalyst support comprises silica.

10. The process of claim 8 wherein the catalyst support comprises silica-alumina.

11. The process of claim 8 wherein said olefin is a normally gaseous olefin.

12. The process of claim 8 wherein said olefin comprises principally ethylene.

13. A process for polymerizing ethylene which comprises contacting same under polymerizing conditions with a catalyst made by the process of claim 7.

References Cited in the file of this patent

UNITED STATES PATENTS

| | | |
|---|---|---|
| 1,084,258 | Ellis | Jan. 13, 1914 |
| 1,156,674 | Ellis | Oct. 12, 1915 |
| 1,956,585 | Oglesby et al. | May 1, 1934 |
| 2,606,940 | Bailey et al. | Aug. 12, 1952 |
| 2,696,475 | Farrow | Dec. 7, 1954 |